(12) United States Patent
Mak et al.

(10) Patent No.: US 12,147,862 B2
(45) Date of Patent: Nov. 19, 2024

(54) ELECTRONIC MONITORING DEVICE (71) Applicant: Hong Kong R&D Centre for Logistics and Supply Chain Management Enabling Technologies Limited, Pok Fu Lam (HK)

(72) Inventors: Chi Lun Mak, Pok Fu Lam (HK); Xin Wang, Pok Fu Lam (HK); Guang Bo Li, Pok Fu Lam (HK); Hai Long Zhu, Pok Fu Lam (HK); Jing Tian Xi, Pok Fu Lam (HK); Jian Kun Su, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 0 days.

(21) Appl. No.: 18/145,493

(22) Filed: Dec. 22, 2022

(65) Prior Publication Data

US 2023/0139207 A1    May 4, 2023

Related U.S. Application Data

(63) Continuation of application No. 16/644,613, filed as application No. PCT/CN2017/100899 on Sep. 7, 2017, now abandoned.

(51) Int. Cl.
*G06K 19/07* (2006.01)
*G06Q 50/06* (2012.01)

(52) U.S. Cl.
CPC ..... *G06K 19/0723* (2013.01); *G06K 19/0715* (2013.01); *G06Q 50/06* (2013.01)

(58) Field of Classification Search
CPC .................................. G06K 19/0723
USPC ......................................... 307/104
See application file for complete search history.

(56) References Cited

U.S. PATENT DOCUMENTS

2016/0285416 A1*  9/2016  Tiwari .................... H02S 50/15

\* cited by examiner

*Primary Examiner* — Joseph Chang
(74) *Attorney, Agent, or Firm* — Renner, Kenner, Greive, Bobak, Taylor & Weber (57) ABSTRACT

An electronic device for monitoring. The electronic device includes a functional module arranged to provide an active function, a communication module arranged to communicate with an external communication device, and an energy harvesting module arranged to transform a source energy from an external source to electrical energy for energising both the communication module and the functional module.

15 Claims, 13 Drawing Sheets

ELECTRONIC MONITORING DEVICE

TECHNICAL FIELD

The present invention relates to an electronic monitoring device. Particularly, although not exclusively, the invention relates to an electronic device and a system including at least one electronic device for sensing and monitoring.

BACKGROUND

There are many physical properties that vary with the environment, time, location, etc. Some examples are temperature, light, wind, humidity, sound level, air quality. These properties are important in that they affect our health and our comfort. Therefore, it would be beneficial to monitor and keep track of these physical properties. For example, if the temperature is too high or too cold, responsible party can remind the public to avoid staying out for long or to wear thicker clothes when they go out; or if the sound level is too high at a corner of a club, the user can tune down the music volume of one particular microphone.

Many devices are developed to measure these physical properties. Users can use a conventional mercury thermometer or a digital thermometer to measure temperature, or a sound level meter to measure the loudness. Technologies nowadays allow users to read a digital value of the measurement from the devices directly. In cases where users would like to measure properties at different location or at a different time, they can repeat the measurement and record the measurements by pens and paper for tracking and statistics purpose.

This way of measuring and keeping track of these physical properties are time-consuming and costly. In one example, the user may have to walk through the whole area of a large premise such as a shopping mall or a station to measure the temperature at different location in order to turn up or turn down the temperature of a particular air-conditioner. Additionally, these measuring devices consume a lot of energy, and batteries may have to be replaced very frequently which cost a lot of money.

SUMMARY OF THE INVENTION

In accordance with a first aspect of the present invention, there is provided an electronic device comprising a functional module arranged to provide an active function, a communication module arranged to communicate with an external communication device, and an energy harvesting module arranged to transform a source energy from an external source or from the ambient environment to electrical energy for energising both the communication module and the functional module. Preferably, the functional module includes at least one sensor for sensing and monitoring.

In one embodiment of the first aspect, the energy harvesting module comprises an energy harvester arranged to harvest the source energy from the external source.

In one embodiment of the first aspect, the source energy includes light energy.

In one embodiment of the first aspect, the energy harvester includes a photovoltaic panel.

In one embodiment of the first aspect, the source energy includes radio-frequency waves.

In one embodiment of the first aspect, the radio-frequency waves are arranged to be radiated from an antenna, which is connected to a radio-frequency identification (RFID) reader.

In one embodiment of the first aspect, the energy harvester comprises a radio-frequency energy harvesting antenna.

In one embodiment of the first aspect, the energy harvesting module further comprises an energy storage arranged to store the transformed electrical energy.

In one embodiment of the first aspect, the energy harvesting module further comprises a voltage regulator arranged to stabilise and regulate a voltage output of the electrical energy providing to the functional module and the communication module.

In one embodiment of the first aspect, the communication module comprises a communication antenna arranged to communicate with the external communication device.

In one embodiment of the first aspect, the communication module further comprises a memory chip arranged to store an output from the functional module.

In one embodiment of the first aspect, the communication module includes a Bluetooth communication module.

In one embodiment of the first aspect, the communication module includes a Bluetooth Low Energy (BLE) communication module.

In one embodiment of the first aspect, the communication module includes a radio-frequency communication module.

In one embodiment of the first aspect, the external communication device includes a radio-frequency identification (RFID) reader with an antenna.

In one embodiment of the first aspect, the communication module includes a radio-frequency identification (RFID) transponder.

In one embodiment of the first aspect, the external communication device includes an RFID reader with antenna arranged to energise both the RFID transponder and the functional module when upon the RFID reader reads the RFID transponder.

In one embodiment of the first aspect, the functional module includes a sensor.

In one embodiment of the first aspect, wherein the sensor is arranged to detect one or more attributes of an environment or an object by monitoring one or more electronic outputs, and wherein the one or more electronic outputs change in response to the one or more attributes of the environment or the object.

In one embodiment of the first aspect, the sensor includes a temperature sensor and/or a humidity sensor.

In one embodiment of the first aspect, the functional module includes a clock arranged to determine a time stamp associated with the one of more electronic outputs.

In accordance with a second aspect of the invention, there is provided a monitoring system comprising at least one electronic device, wherein the external communication device is arranged to communicate with the at least one electronic device so as to monitor one or more attributes of an environment or an object.

In one embodiment of the second aspect, the external communication device is arranged to repeatedly communicate with the at least one electronic device in a predetermined time interval so as to monitor the one or more attributes of the environment or the object within a predetermined time period.

In one embodiment of the second aspect, the external communication device is further arranged to determine a position of each of the electronic device based on a signal received by the communication device.

In one embodiment of the second aspect, the one or more attributes include temperature and/or humidity.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
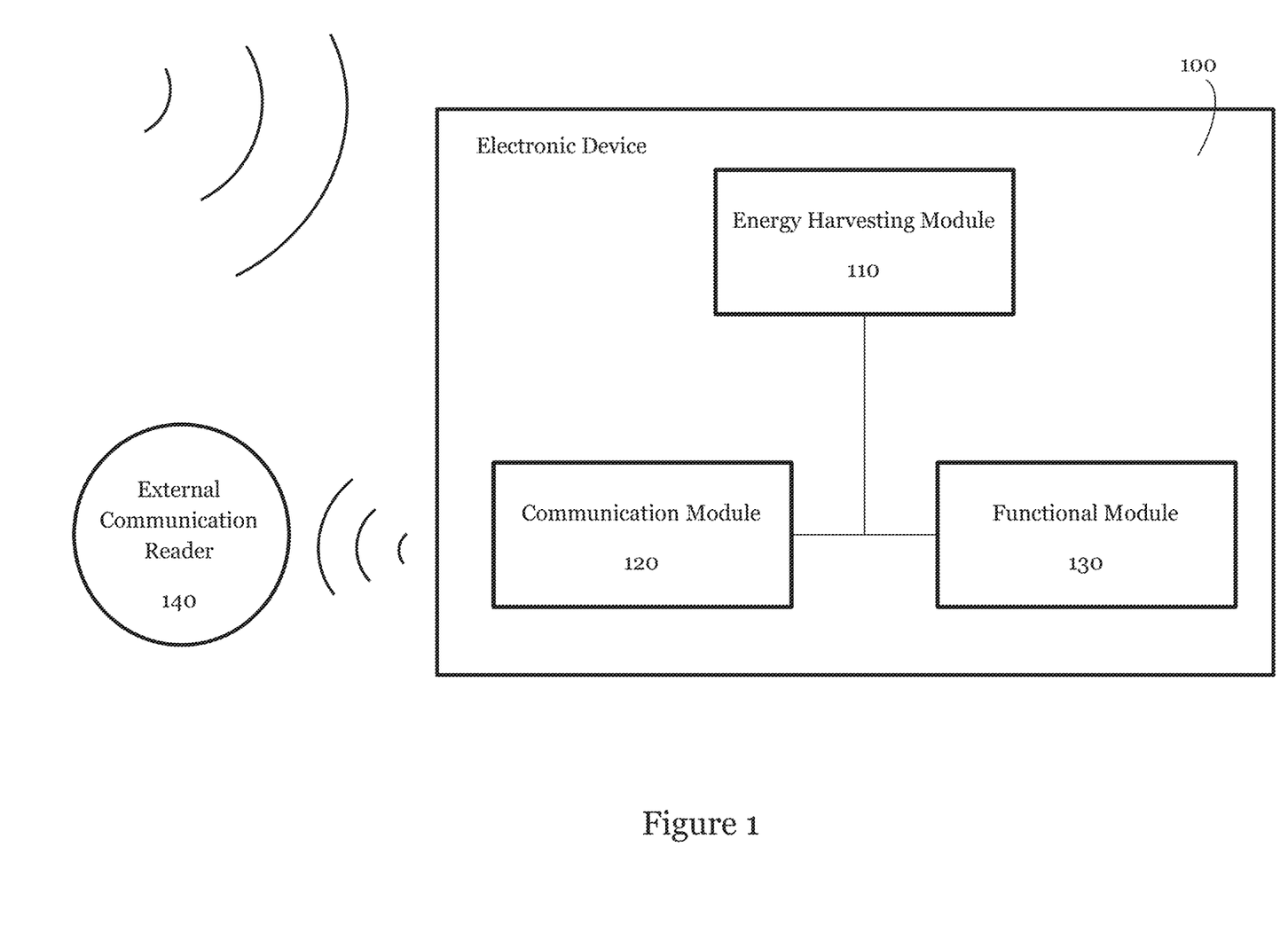
FIG. 1 is a functional block diagram of an electronic device in accordance with one embodiment of the present invention.

Referring to FIG. 1, there is shown an example embodiment of an electronic device 100 comprising a functional module 130 arranged to provide an active function, a communication module 120 arranged to communicate with an external communication device 140 and an energy harvesting module 110 arranged to transform a source energy from an external source or from ambient environment to electrical energy for energising both the communication module 120 and the functional module 130.

In this embodiment, the electronic device 100 may be a detector or a sensor for use in a monitoring system. The functional module 130 may include one or more electronic components which require electrical energy so as to provide an active function. In a preferred embodiment, by monitoring one or more electronic outputs, the sensor may detect one or more attributes of an environment or an object, such as but not limited to humidity and temperature. The one or more electronic outputs may change in response to the change of the one or more attributes being monitored. For example, the sensor may be a temperature sensor or a humidity sensor for detecting temperature and humidity. Alternatively, other sensors or detectors may also be used, for example but not limited to a light sensor, a motion sensor, a pressure sensor, an air quality monitoring detector, flow meter and altitude sensor, etc. In some embodiments, there may be more than one sensor in the functional module 130.

The sensor may be in direct contact with or be positioned at a distance from the environment or the object to be monitored. For example, the sensor may be exposed to air in a room, or attached to a surface of an object, wherein upon contact, electrical parameters such as voltage outputs, capacitance and resistance may change in response to the change in one or more attributes. By monitoring the electronic outputs or the electrical parameters, the one or more attributes of the environment or the object can be detected. In an alternative example, the sensor may be positioned at a distance from an object for measuring the one of more attributes such as temperature or the relative movement of the object.

Additionally or alternatively, the functional module 130 may comprise other functional units or electronic components such as an alarm, one or more indicators, a processor and a memory, so as to provide other types of active function.

The communication module 120 may be an RFID or a BLE communication module or any other communication standard such LoRa, WiFi, etc., which requires electrical energy to transmit and receive signals to and from an external communication device 140. Preferably, the communication is wireless, but may also be wired. The electronic outputs may be transmitted from the functional module 130 to the communication module 120, which may then be transmitted to an external communication device 140 for processing and further action and analysis.

The electronic device wo further comprises an energy harvesting module no arranged to harvest energy from an external source so as to supply sufficient energy for powering the communication module 120 and the functional module 130 during an operation of the electronic device wo. Preferably, the energy harvesting module no may comprise an energy harvester arranged to harvest the source energy from the external source. The source energy may take various forms, such as light energy and electromagnetic energy, and accordingly, the external source comprising the source energy may be the natural physical environment or a device. The source energy may be further transformed to electrical energy required by the communication module 120 and/or the functional module 130.

The external source and the external communication device may be of the same device in one embodiment. For example, a radio-frequency identification (RFID) reader may be used for energising and communicating with the electronic device 100. In another embodiment, the external source may be a different source or device from the external communication device. For example, the external source can be sunlight, a light apparatus, an inductive coil, or an external power transmitter, etc. Alternatively, the energy may be light or other sources of energy obtainable from the ambient environment The external communication device may be a computer, a mobile phone, a tablet, etc.

Figure 2:
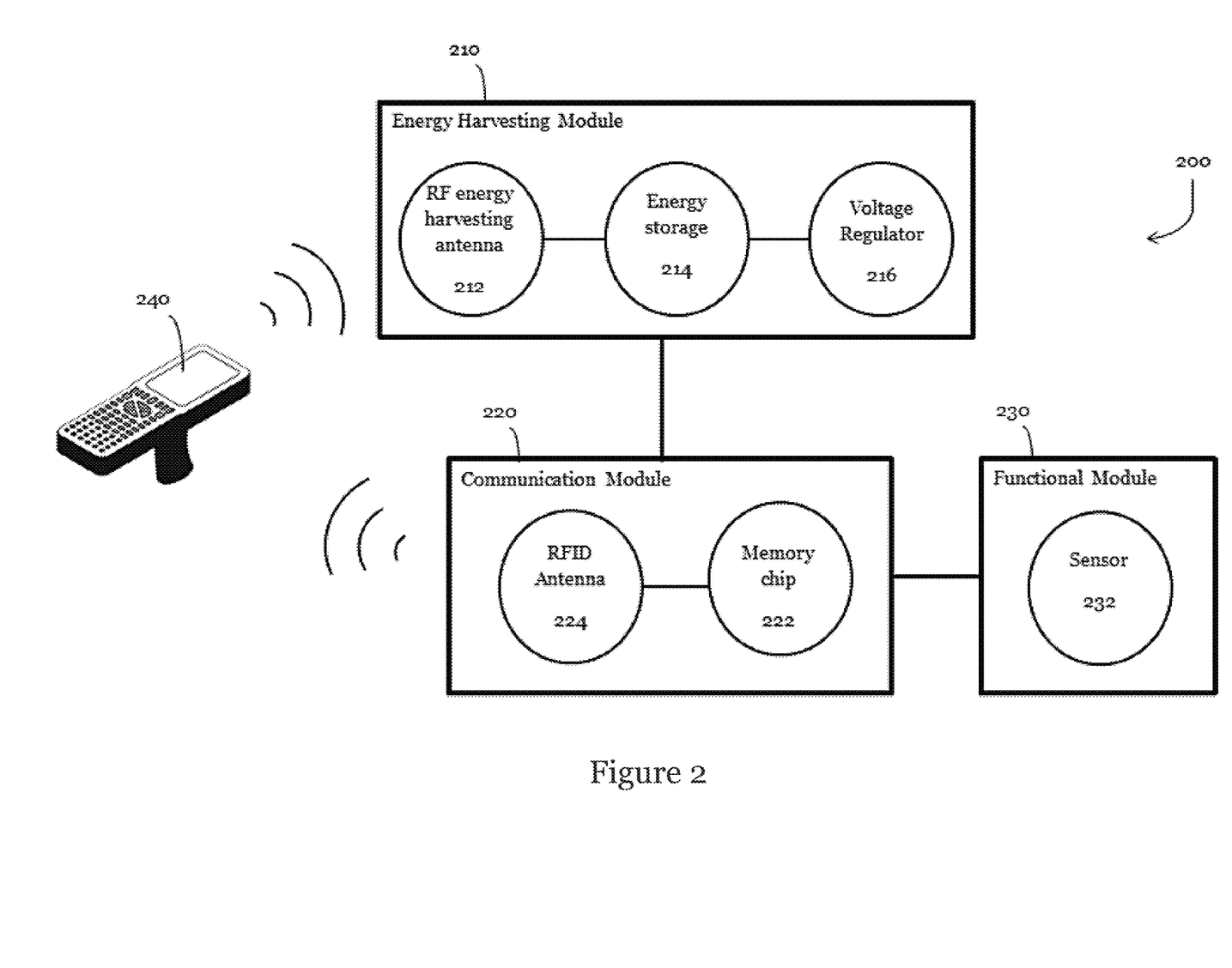
FIG. 2 is a functional block diagram of the electronic device using RFID in accordance with one embodiment of the invention.

Referring now to FIG. 2, there is shown an electronic device 200 using RFID in accordance with one embodiment of the invention. In this example, the communication module 220 is a radio-frequency (RF) communication module such as a radio-frequency identification (RFID) transponder arranged to communicate with an RFID reader 240. RFID reader 240 can be a fixed RFID reader or a handheld reader, which are connected to an antenna. Preferably, the RFID reader 240 arranged to radiate radio-frequency (RF) waves for energising and communication with the RFID transponder 220.

In this embodiment, the energy harvesting module 210 comprises an energy harvester 212 which may include, a radio-frequency (RF) energy harvesting antenna for transforming the received radio-frequency (RF) waves to electrical energy. Optionally, the energy harvester may also include an energy storage 214 and a voltage regulator 216 in connection with the RF energy harvesting antenna 212 for temporally storing the harvested energy and regulating the electrical energy outputs from the energy harvesting antenna 212 and/or the energy storage 214.

Figure 3:
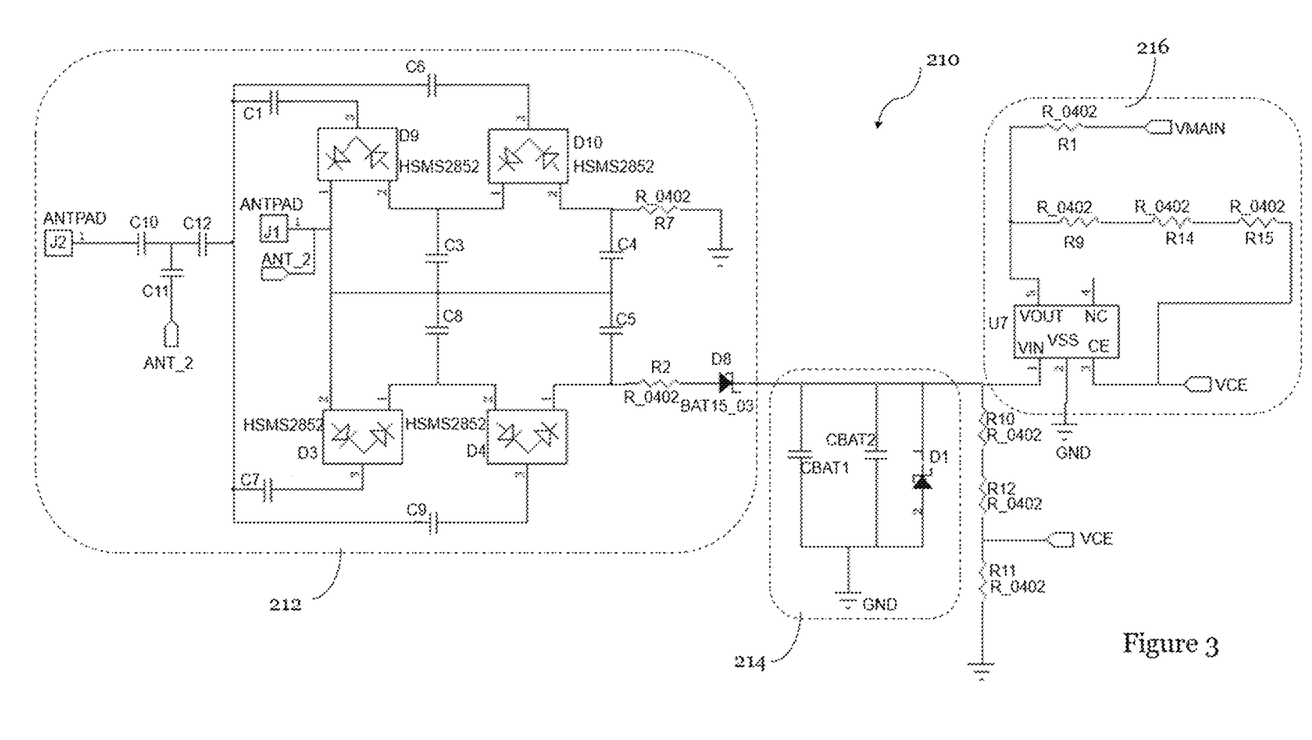
FIG. 3 is a circuit diagram of the energy harvesting module of the electronic device of FIG. 2.

With reference to FIG. 3, there is provided an energy harvesting module 210 of the electronic device 200. In this example, the energy harvester 212 includes a voltage multiplier structure for converting radio-frequency (RF) waves to DC power by rectifying the peak-to-peak voltage of the RF waves. Electronic components such as diodes and capacitors may be used to provide voltage offset, rectification, amplification, etc. The transformed electrical energy may be then stored in the energy storage 214 which comprises a pair of capacitively-coupled conductors for charging and discharging. Additionally or optionally, the energy storage 214 may also include a rechargeable battery for storing the harvested energy for prolonged usage when the electronic device 200 is no longer being exposed to an external energy source. The voltage regulator 216 may regulate the electrical output from the energy storage 214 and/or the RF energy harvesting antenna 212 at a desired voltage since electrical energy harvested from different energy source may produce a different voltage output. This may damage the electronic device 200 in the case where the voltage output exceeds the threshold value of one or more electronic components.

Referring back to FIG. 2, the functional module 230 includes a sensor 232. The senor 232 may be a temperature or a humidity sensor whereby electronic outputs such as current and capacitance change in response to a change in temperature or humidity of the environment or an object. The functional module 230 may further comprises a clock or timer for determining a time stamp associated with the electronic outputs. The electronic outputs may be transmitted to the RFID transponder or tag which comprises a memory chip 222 and a communication antenna 224. The electronic outputs transmitted from the functional module 230 may be stored in the memory chip 222. Preferably, the memory chip 222 is a memory which can be read by an external communication device 240 when desired for retrieving the detected electronic outputs. In the RFID transponder, a communication antenna 224 is operably connected to the RFID chip 222 for communicating the detected electronic outputs to an external communication device 240.

Preferably, the antenna 224 may be a radio-frequency identification (RFID) antenna for transmitting and receiving radio-frequency (RF) waves to and from the radio-frequency identification (RFID) reader 240. The RFID transponder may be passive, wherein the electronic device 200 only communicates with the RFID reader when received a signal from the reader. In this example, a user may radiate radio-frequency (RF) waves towards the electronic device 200 using an RFID reader for retrieving the detected electronic outputs and for further determination and analysis of the one of more attributes of the environment or the object. At the same time, the radio-frequency waves radiated from the RFID reader 240 may also be provided as an external source of energy for energising the electronic device 200. Alternatively, the RFID reader 240 may be used only for communication with the RFID tags, and the electronic device 200 may be powered by other RF energy sources.

Figure 4A:
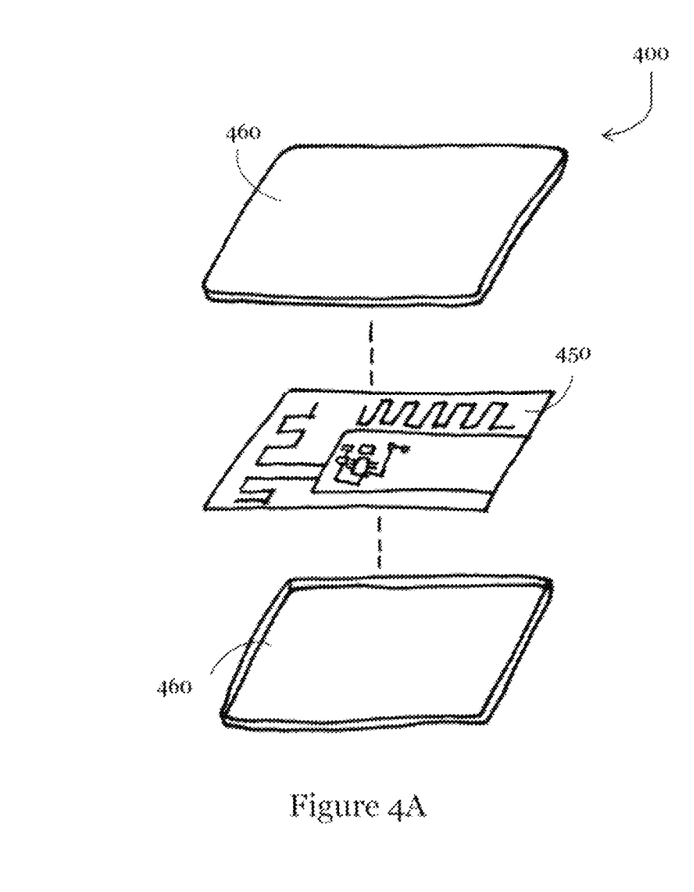
FIG. 4A is an exploded view of an embodiment of the electronic device of FIG. 2.
Figure 4B:
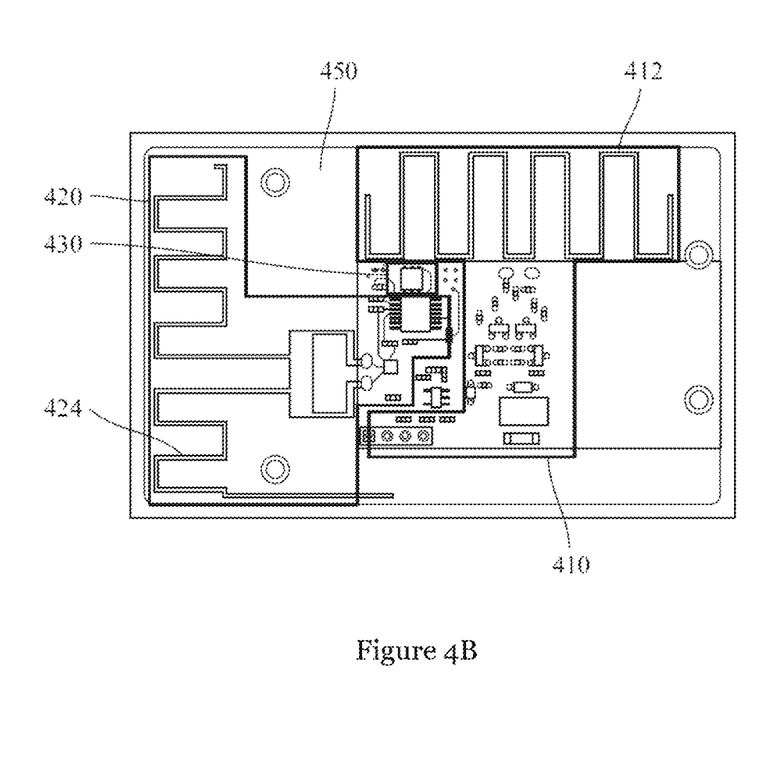
FIG. 4B is a photographic image of a printed circuit board of the electronic device of FIG. 4A.

With reference to FIGS. 4A and 4B, there is shown an embodiment of the electronic device 400. In this embodiment, the electronic device 400 comprises a housing 460, wherein the housing 460 is substantially rectangular, but it may be shaped differently in other embodiments. For example, in other embodiments, the electronic device 400 may be square or trapezoidal. The housing 460 is preferably made of light-weighted but tough material such as plastic or carbon fibre, such that the electronic device 400 is substantially shockproof and can be easily mounted or attached to an object. One or more sealing material may be positioned around the opening of the housing 460 for providing watertight sealing to protect the electronics components of the electronic device 400 against water and dust.

A printed-circuit board 450 of the electronic device 400 is positioned inside the housing 460. With reference to FIG. 4B, the energy harvesting module 410, the communication module 420 and the functional module 430 may be soldered onto the printed circuit board 450. Each of the energy harvesting antenna 412 and the communication antenna 424 may be positioned or defined on the same or different edges of the printed circuit board 450. In one example embodiment, the printed circuit board 450 is 82 mm in length, 51 mm in width and 2.3 mm in height, wherein the housing 460 is 86.2 mm in length, 55.1 mm in width and 6.8 mm in height. The communication range of the electronic device 400 with an RFID reader may be up to 3 m. In other embodiments, the dimensions of the device 400 and the communication range may increase or decrease in different applications.

Figure 4C:
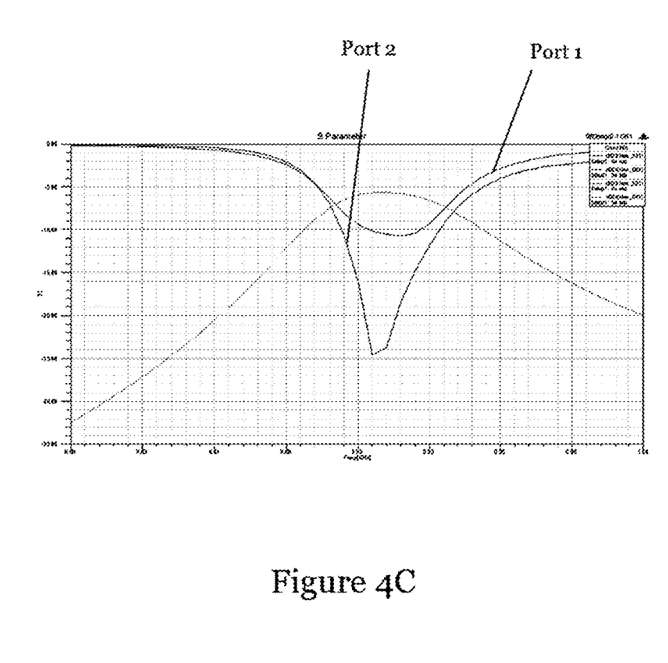
FIG. 4C is a graph showing the return loss and isolation of the energy harvesting antenna and the communication antenna of the electronic device of FIG. 4A.
Figure 4D:
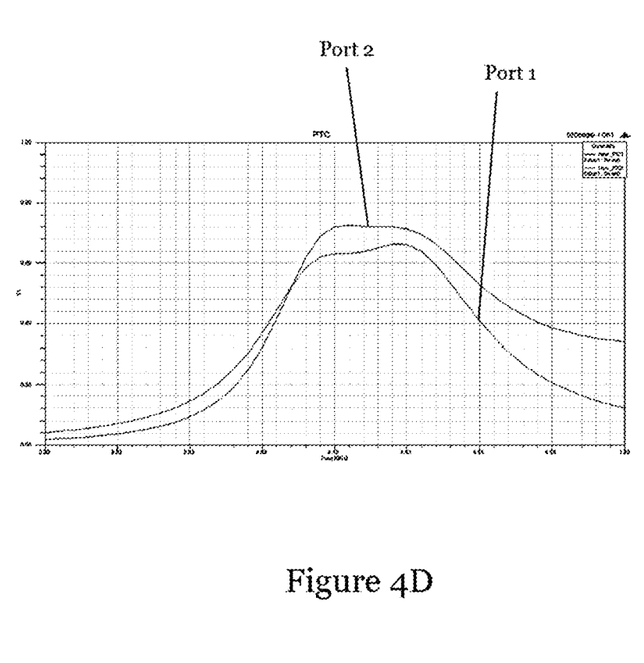
FIG. 4D is a graph showing the power transfer coefficient of the energy harvesting antenna and the communication antenna of the electronic device of FIG. 4A.

With reference to FIGS. 4C and 4D, there is shown experimental results of the electronic device 400 in accordance with an embodiment of the present invention. In the experiment, the RF energy harvesting antenna and the RFID communication antenna were specified as ports 1 and 2 respectively, and the performances of the electronic device were evaluated by simulations.

Referring to the plots representing the return loss and the power transfer coefficients, the two antennas operated under the same frequency band around the frequency range of 860 MHz to 960 MHz. In addition, it was also observed that a mutual coupling between the two antennas is below −5 dB within such frequency band.

Figure 5:
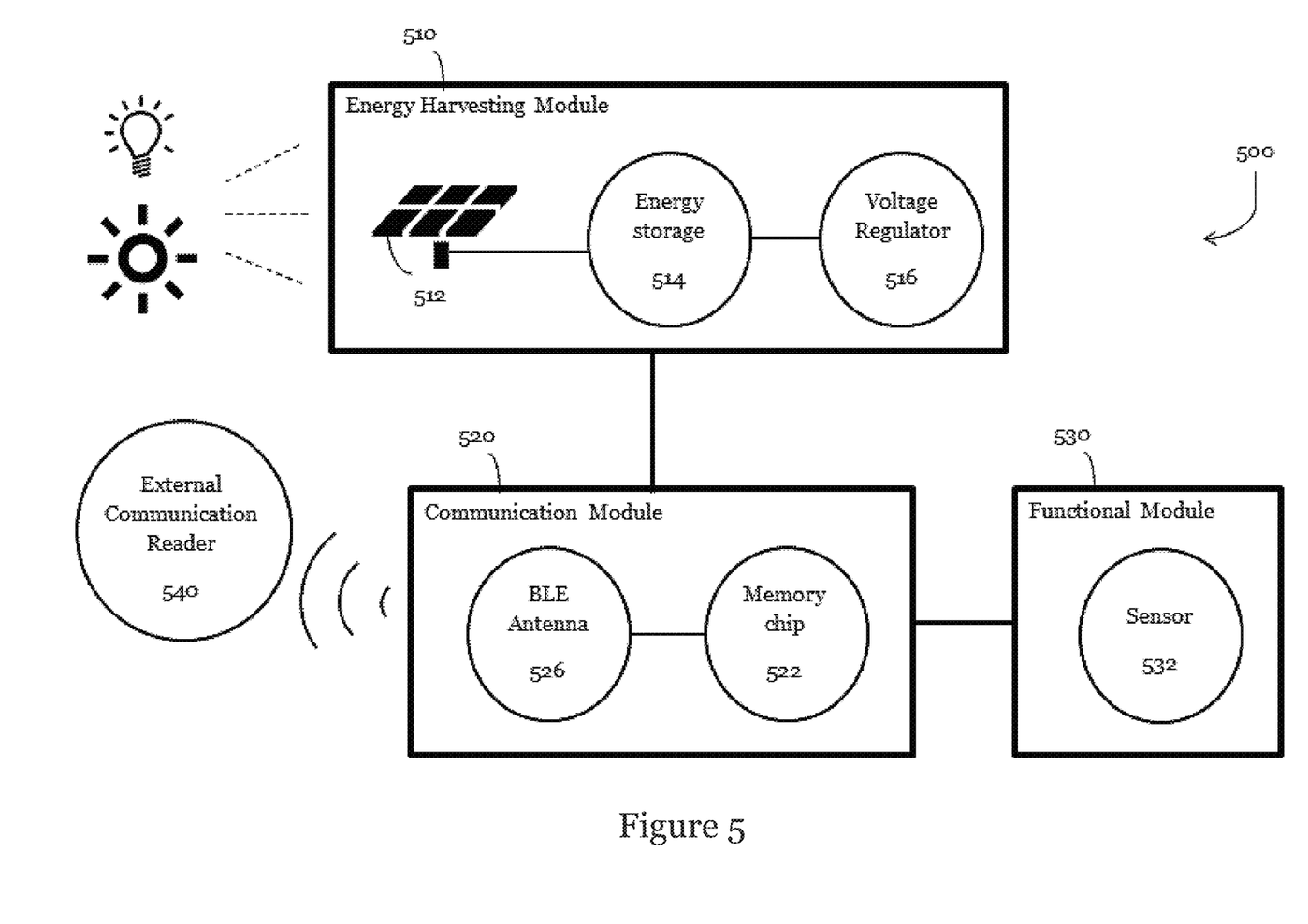
FIG. 5 is a functional block diagram of an electronic device using BLE in accordance with one embodiment of the invention.

Referring now to FIG. 5, there is shown an electronic device 500 using BLE in accordance with another embodiment of the invention. In this embodiment, the harvester 512 is a photovoltaic panel for transforming light energy provided by a light source, such as from sunlight or a light apparatus, to electrical energy. Alternatively, the harvester 512 may be a coating of photovoltaic paint on the outside of the electronic device 500 for receiving light energy from external environment. Advantageously, photovoltaic panels may be used for harvesting a higher amount of energy in an environment which may provide a substantially stable or sufficient source of ambient lighting, so as to power communication and/or functional modules which may require a higher operation rating.

Figure 6:
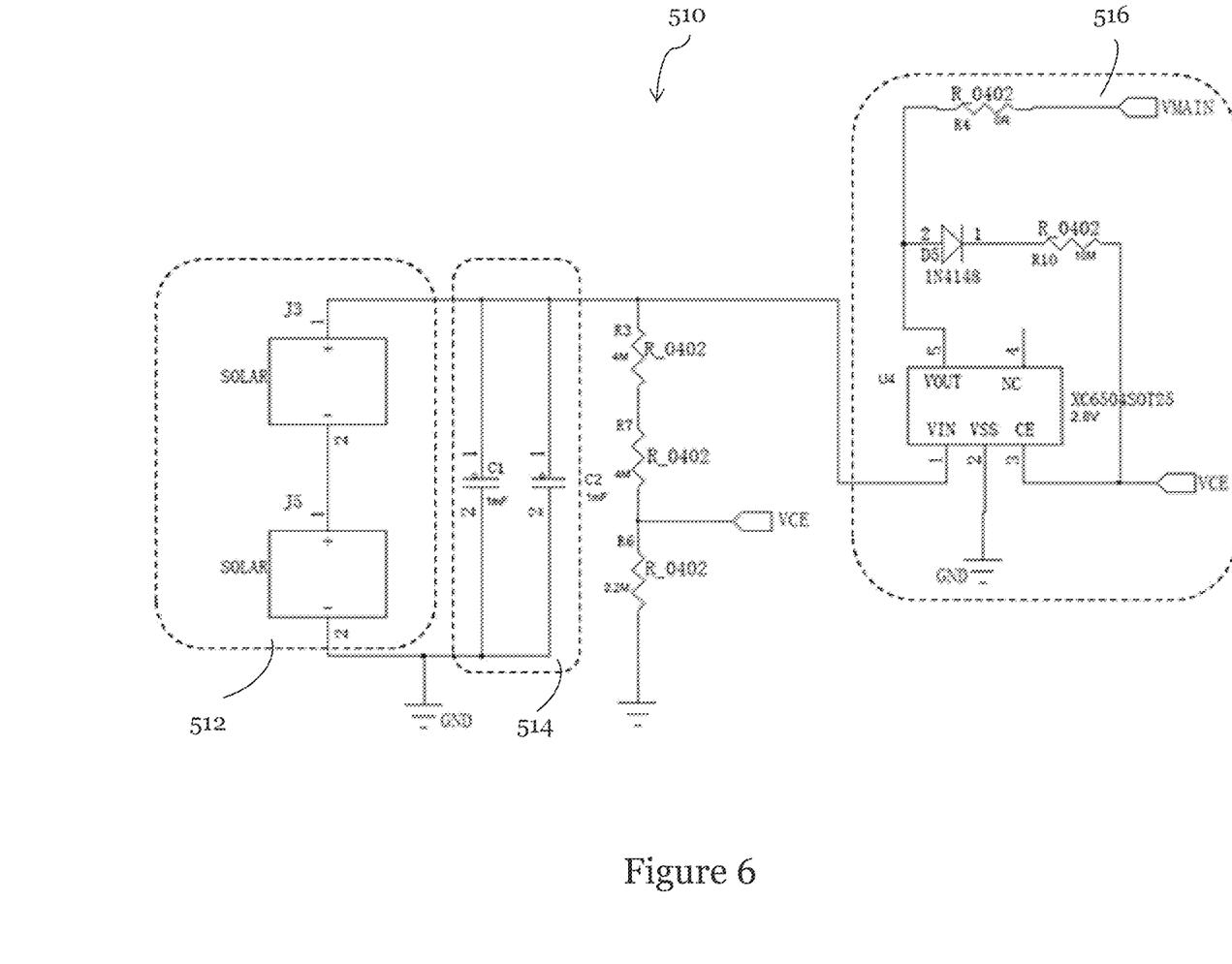
FIG. 6 is a circuit diagram of the energy harvesting module of the electronic device of FIG. 5.

With reference to FIG. 6, the energy harvester 512 of the electronic device 500 includes at least one photovoltaic panel for transforming light energy to electrical energy. One or more ultra-capacitors or rechargeable battery cells may be used as energy storage 514 to improve the performance during a low light intensity situation. The transformed electrical energy may then be stored in the energy storage 514 before passing through a voltage regulator 516 to supply energy at a desired voltage to the rest of the electronic device 500.

Referring back to FIG. 5, the functional module 530 includes one or more sensor 532. Similar to the previous embodiments, the sensor 532 may also detect temperature and/or humidity of the environment or the attached object by transmitting the electronic outputs and associated time stamp to the communication module 520. In this embodiment, the communication module 520 includes a Bluetooth communication module. For example, it may comprise a Bluetooth Low Energy (BLE) communication module. The Bluetooth communication module includes a memory 522 which stores the electronic outputs from the functional module 530 and a communication antenna 524 operably connected to the memory 522 for communicating the detected electronic outputs to an external communication device 540. In this embodiment, the antenna 526 is a Bluetooth Low Energy (BLE) antenna for actively and continuously broadcasting the detected electronic outputs to the external communication device 540 at a regular predetermined time interval. The external communication device 540 may be a smart device, computer, a laptop or a mobile phone capable of receiving the broadcasted signals from the electronic device 500.

Figure 7A:
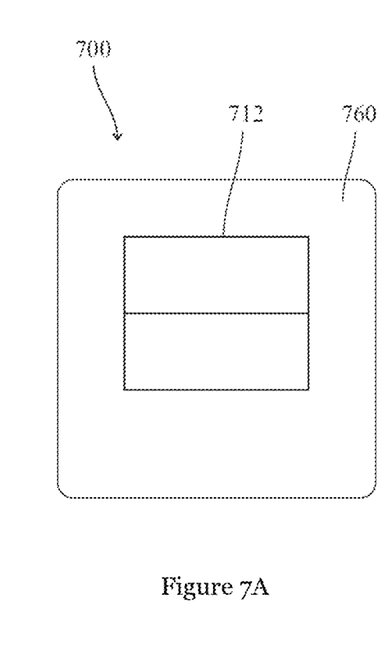
FIG. 7A is a photographic image showing a top view of the electronic device of FIG. 5.
Figure 7B:
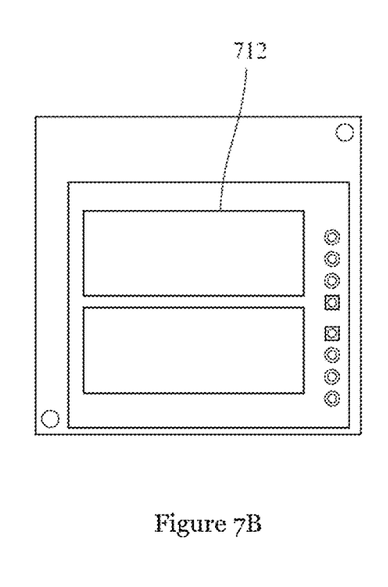
FIG. 7B is a photographic image showing a top view of the electronic device of FIG. 7A, wherein the top cover is removed to reveal an energy harvester on the printed circuit board of the electronic device.
Figure 7C:
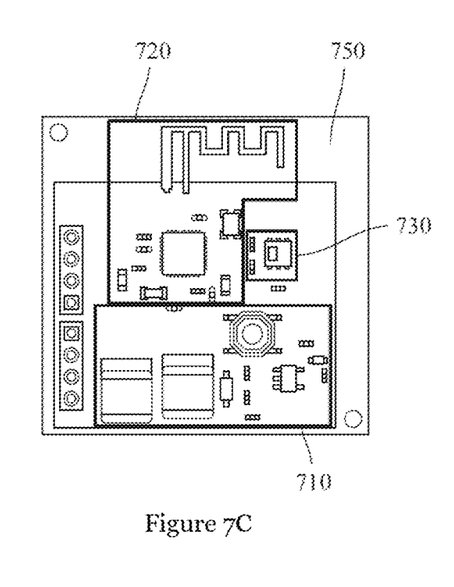
FIG. 7C is a photographic image of an opposite side of the printed circuit board of the electronic device of FIG. 7B.

With reference to FIGS. 7A to 7C, there is shown an embodiment of the electronic device 700. The electronic device 700 includes a non-metal housing 760, wherein the housing 760 is substantially square. The housing 760 is preferably made of light-weighted but tough material such as plastic or carbon fibre, such that the electronic device 700 is substantially shockproof and can be easily mounted or attached to an object. Preferably, there is a cut-through or a transparent portion on the top of the housing 760 such that a photovoltaic panel 712 can be exposed and receives light energy from the outside environment. As shown in FIG. 7B, the photovoltaic panel 712 can be mounted on a printed circuit board and being placed directly under the housing 760.

A printed-circuit board 750 of the electronic device 700 is positioned inside the housing 760. Referring to FIG. 7C, at least part of the energy harvesting module 710, the communication module 720 and the functional module 730 may be soldered onto the printed circuit board 750. In one example embodiment, the printed circuit board 750 is 38 mm in length, 38 mm in width and 3.7 mm in height, wherein the housing 760 is 42 mm in length, 42 mm in width and 6.6 mm in height. In other embodiments, the dimensions of the device 700 may increase or decrease in different applications.

Figure 8:
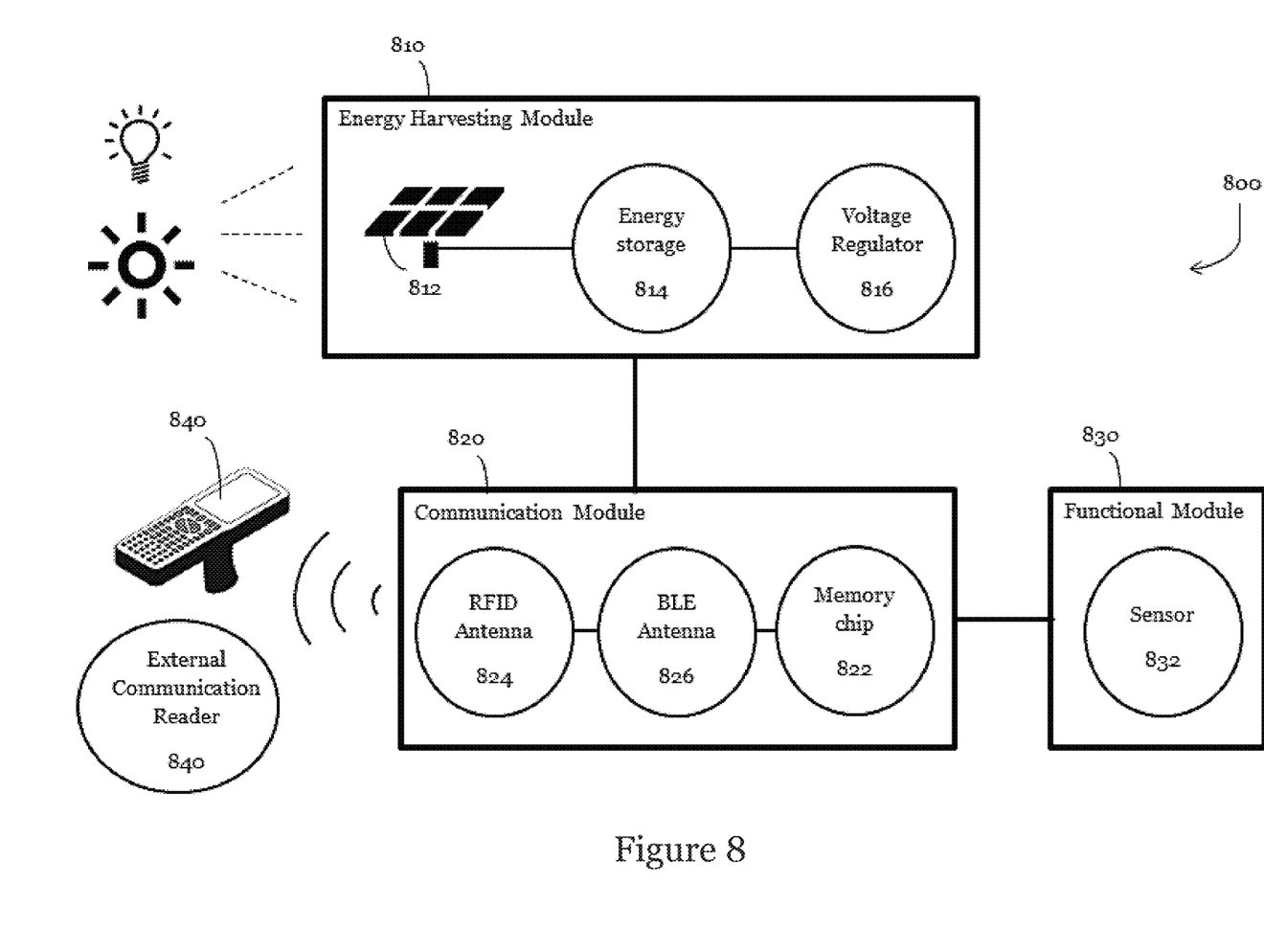
FIG. 8 is a functional block diagram of the electronic device using RFID and BLE in accordance with one embodiment of the invention.

With reference to FIG. 8, there is shown an alternative embodiment of an electronic device 800 using both RFID and BLE. In this embodiment, the energy harvesting module 810 comprises a photovoltaic panel 812 for harvesting light energy from a light source such as sunlight or a light apparatus to electrical energy for energising the electronic components of the electronic device 800.

In this embodiment, a sensor 832 is included to detect temperature and humidity of the environment or an attached object. The detected electronic outputs and the associated time stamp are transmitted to a duel RFID and BLE communication module 820. The communication module 820 comprises a RFID chip 822, a radio-frequency identification (RFID) antenna 824 and a Bluetooth-low-energy (BLE) antenna 826 and a BLE memory 828. The electronic outputs transmitted from the functional module 830 are stored in the RFID chip 822.

The RFID antenna 824 is connected to the RFID chip 822 for communicating the detected electronic outputs to an external communication device 840. In this embodiment, the BLE antenna 826 actively broadcasts the detected electronic outputs to an external communication device 840 while the detected electronic outputs are being written into the RFID chip 822 at a regular predetermined time interval. The external communication device 840 may be a smart device, laptop, a mobile phone, or a computer system capable of receiving the broadcasted signals from the electronic device 800.

A user may also utilize the RF communication module to retrieve the detected electronic outputs at a regular predetermined time interval and review a sensing log from a computer system or a mobile phone for monitoring and analysing the one or more attributes of the environment or the object. Preferably, the RFID antenna 824 can transmit and receive radio-frequency (RF) waves to and from a radio-frequency identification (RFID) reader 840. Therefore, a user can also radiate radio-frequency (RF) waves using an RFID reader towards the electronic device 800 for retrieving the detected electronic outputs and for determination and analysis of the one of more attributes of the environment or the object.

Optionally, the energy harvesting module may comprise both a photovoltaic panel as well as an RF energy harvesting antenna so as to maximize the energy harvesting capability of the electronic device. In this example, the recorded electronic outputs stored in the memory chip may be read even when there is no sufficient light energy in the ambient or the BLE communication module does not have sufficient power to operate, a user may use a RFID reader to energise the RFID tag so as to read the output stored in the memory chip.

Figure 9A:
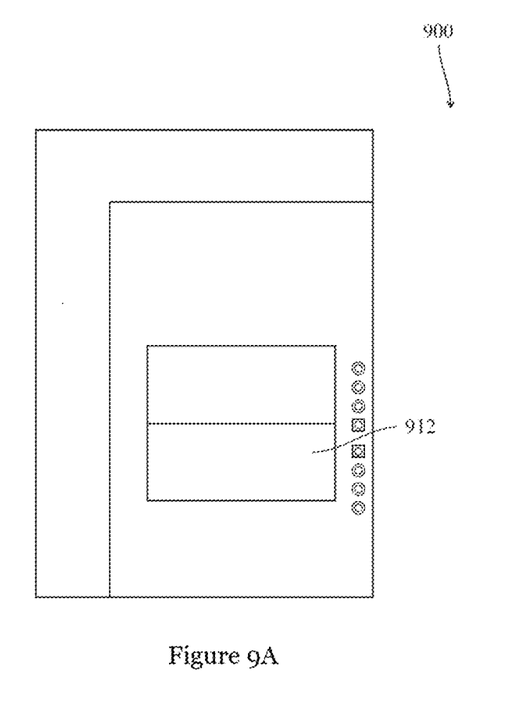
FIG. 9A is a photographic image showing a top view of the electronic device of FIG. 8, with an energy harvester on a printed circuit board of the electronic device.
Figure 9B:
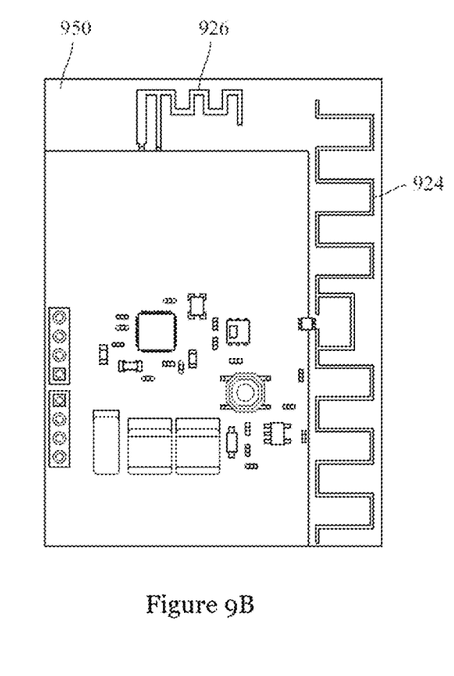
FIG. 9B is a photographic image of an opposite side of the printed circuit board of the electronic device of FIG. 9A.

With reference to FIGS. 9A and 9B, there is show an embodiment of an electronic device 900. The electronic device 900 includes a non-metal housing (not shown) which may be similar to the previous embodiments as discussed. Similarly, there is a cut-through or a transparent portion on the top of the housing such that a photovoltaic panel 912 can be exposed and receive light energy from the external environment. As shown in FIG. 9A, the photovoltaic panel 912 can be mounted on a printed circuit board and being placed directly under the housing.

A printed-circuit board 950 of the electronic device 900 is positioned inside the housing. At least part of the energy harvesting module, the communication module and the functional module may be soldered onto the printed circuit board 950. The RFID antenna 924 and the BLE antenna 926 are each positioned on one edge of the printed circuit board 950. In an example embodiment, the printed circuit board 950 is 64 mm in length, 46 mm in width and 4 mm in height. In other embodiments, the dimensions of the printed circuit board 950 may increase or decrease in different applications.

Figure 9C:
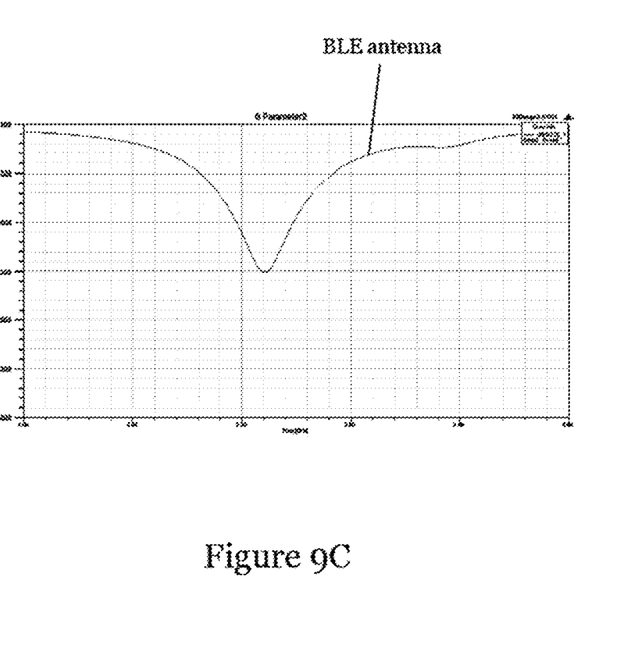
FIG. 9C is a graph showing the return loss of the BLE antenna of the electronic device of FIG. 9A.
Figure 9D:
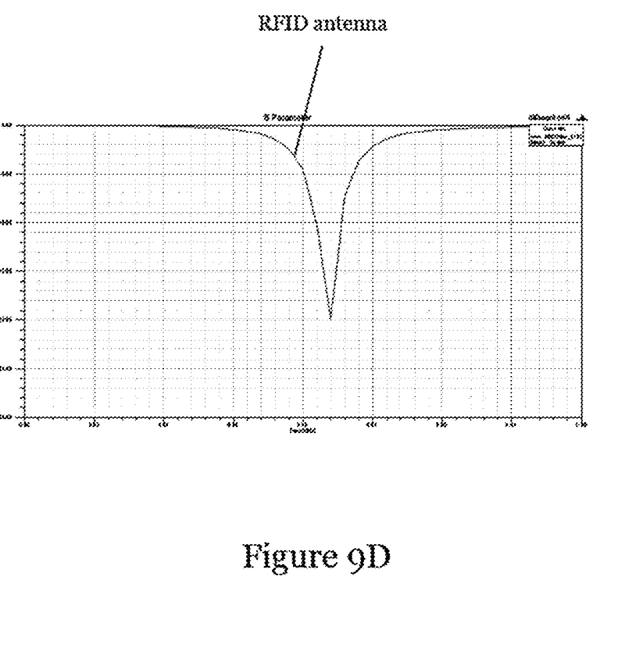
FIG. 9D is a graph showing the return loss of the RFID antenna of the electronic device of FIG. 9A.

With reference to FIGS. 9C and 9D, there is shown simulation results of the electronic device 900. In the simulation, the performances of the BLE communication antenna and the RFID communication antenna were evaluated. Referring to the plots representing the return loss, the BLE and the RFID antennas operated at two different frequency ranges at 2.4 GHz to 2.5 GHz and 920 MHz to 925 MHz respectively.

Figure 10:
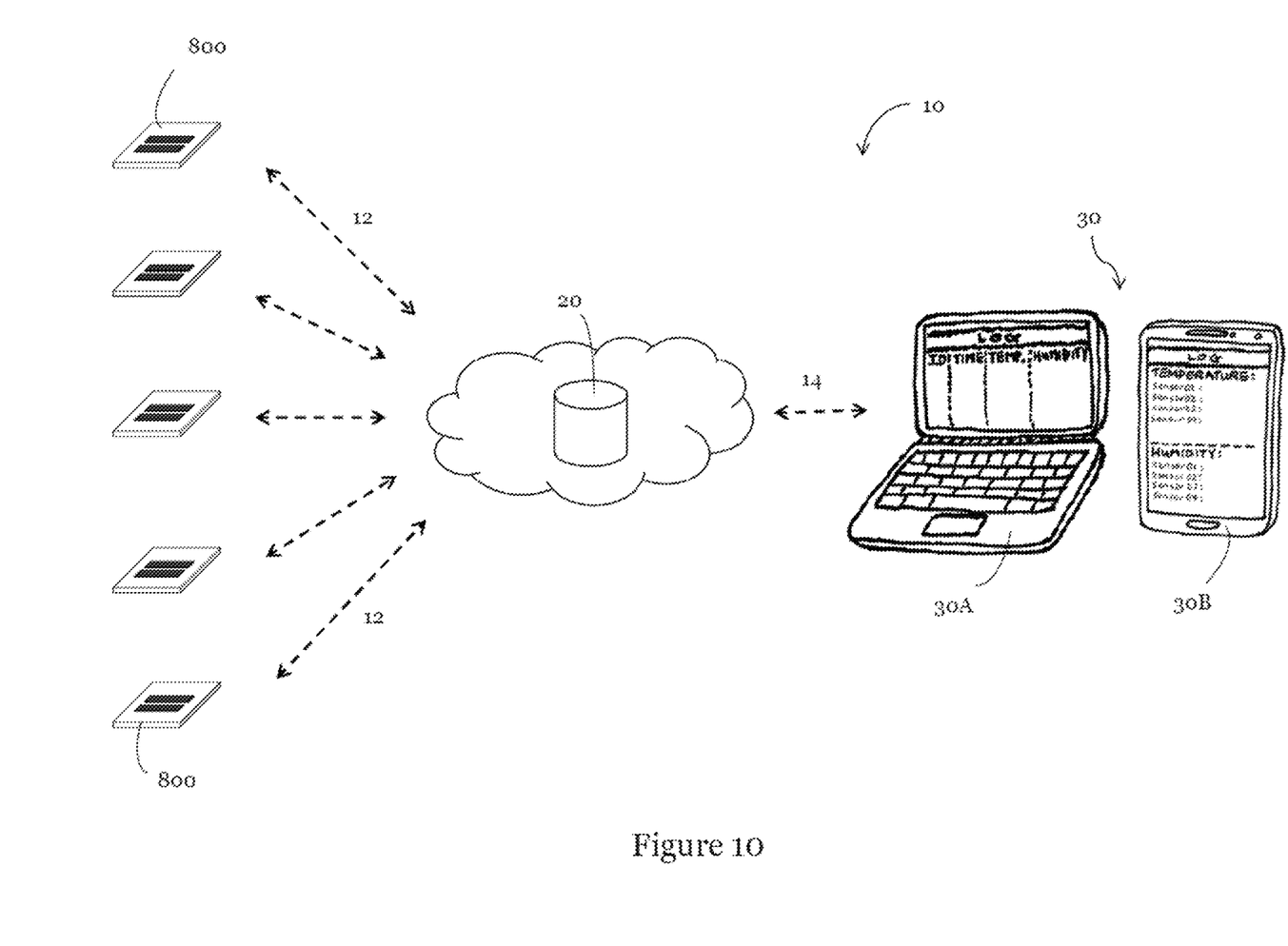
FIG. 10 is a schematic diagram illustrating a monitoring system with multiple electronic devices in accordance with one embodiment of the invention.

Referring now to FIG. 10, there is shown a schematic diagram illustrating a monitoring system 10 with multiple electronic devices 800 in accordance with one embodiment of the invention. The monitoring system 10 comprises multiple electronic devices 800 arranged for sensing and an external communication device 30 is arranged to communicate with multiple electronic devices 800 so as to monitor one or more attributes of an environment or an object. The external communication device 30 is arranged to repeatedly communicate with the multiple electronic devices 800 through one or more communication links in a predetermined time interval so as to monitor the one or more attributes of the environment or the object within a time period. The one or more attributes include but not limited to temperature and humidity.

In an example embodiment, the monitoring system 10 can be applied to an Internet-of-Thing (IOT) application of an automatic airflow and temperature control of a centralised air-conditioning system. In this embodiment, there are five electronic devices 800 each positioned at a different location of a building. In some other embodiments, more or less electronic devices may be used for monitoring there may be twenty electronic devices 800 in one example, or there may be three electronic devices 800 in another example. User can place each electronic device 800 at a desired location targeted for monitoring e.g. different rooms in an apartment, different floors of a building, different locations in a large air-conditioned premises such as airport, museum, shopping mall etc. Preferably, the electronic devices 800 are exposed to light such as natural light from the sun or light from a light apparatus so that the energy harvester of the electronic device 800 can transform light energy to electricity for energising the device.

Upon being energised, the sensors of the electronic devices 800 detect the temperature and humidity of their proximate surrounding. The detected temperature and humidity, together with the corresponding time stamp and the unique ID of each device are transmitted to a memory chip or a temporary storage of the electronic devices 800. The transmitted data are being broadcasted to a smart device 30 via a Bluetooth communication link 12 and then further to server 20 via a communication link 14. The communication link 14 may be a Bluetooth communication link or other wireless or wired communication link such as WiFi, Zigbee, 3G and fixed network. In another embodiment, the detected temperature and humidity may be directly transmitted to the external communication device 30 via a Bluetooth communication link. The detected temperature and humidity are broadcasted at a regular predetermined time interval, e.g. every few seconds, minutes or every hour. Preferably, the position of each of the electronic device 800 can be obtained from the broadcasting signal such that the user can easily track the detected attributes with their corresponding location.

The external communication device 30 can be a laptop 30A or a smart device 30B, but other wireless communication devices which are capable of receiving the detected signals from the electronic devices 800 may also be used. The laptop 30A may have a programme which allows the user to monitor and analyse the detected signals, whereas the user may also use a smart device 30B with a pre-downloaded app for viewing and monitoring. According to the detected temperature and humidity of the electronic devices 800 placed at different location, the user may take corresponding action to ensure a pleasant environment e.g. turning up the temperature of the air-conditioning if the detected temperature is too low for people to feel comfortable or turning down the temperature of the air-conditioning if the outside temperature is too high. Optionally, the user may link the detected temperature and humidity to a centralised system for automatic tuning.

In this embodiment, the user may also retrieve the detected temperature and humidity by radiating radio-frequency (RF) waves using a RFID reader towards the electronic devices 800. The RFID reader can retrieve the detected temperature and humidity, as well as the corresponding time stamp from the electronic devices 800 through a backscattered signal from the electronic devices 800. This monitoring system 10 is advantageous in that it allows a smart centralised air-conditioning system which enhanced passengers and customers' experience by providing a pleasant environment. It is further advantageous in that this monitoring system 10 requires low maintenance and investment cost since the electronic devices 800 make use of renewable energy and battery replacement is not required.

Figure 11:
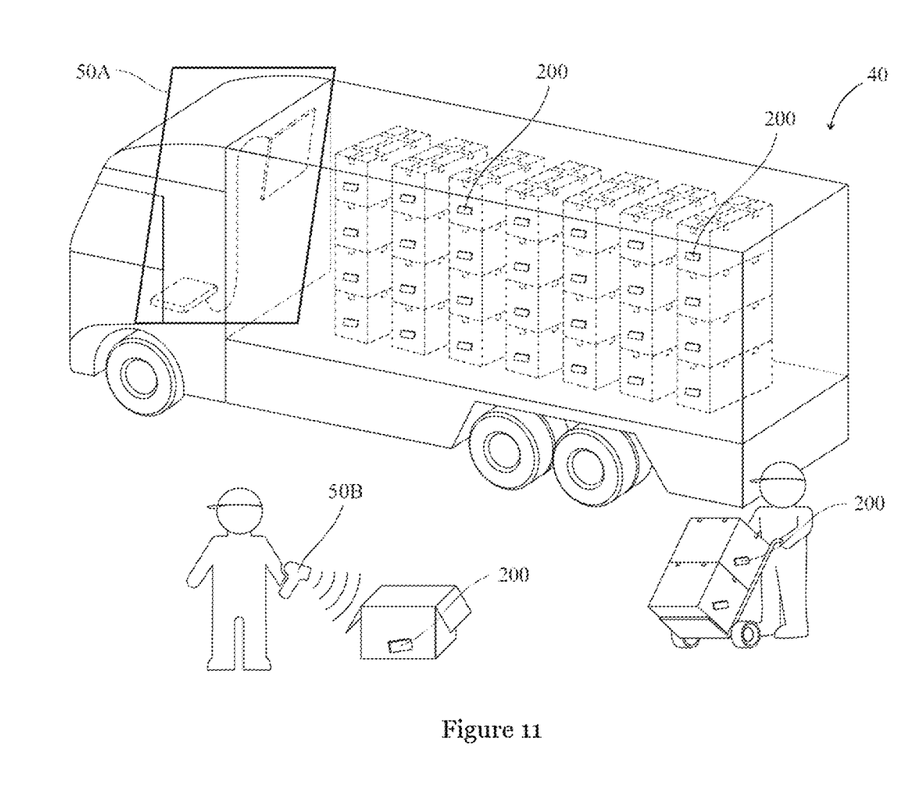
FIG. 11 is a schematic drawing illustrating a monitoring system with multiple electronic devices in accordance with one embodiment of the invention.

FIG. 11 is a schematic drawing illustrating a monitoring system 40 with multiple electronic devices 200 in accordance with one embodiment of the invention for monitoring and tracking individual package's temperature and humidity in cold-chain logistic. In this embodiment, each electronic device 200 is placed inside an individual package loaded in a compartment of a truck, light source may not be available. A high power RFID reader 50A with an RFID antenna is positioned at one end of the truck to energise the electronic devices 200 by radiating radio-frequency (RF) waves towards the devices. The high power RFID reader and antenna enables long and indirect communication range such that the RFID may be placed at any location in the compartment of the truck where the electronic devices 200 can receive the radio-frequency (RF) waves. Upon being energised, the sensor of the electronic devices 200 detect temperature and humidity of individual packages which are then being stored in a RFID chip of the electronic devices 200. The RFID reader can communicate with the electronic devices 200 for retrieving the detected temperature and humidity regularly. The user can therefore monitor the temperature and humidity history of individual package from the RFID reader.

In another example embodiment, the user may use a handheld RFID reader 50B for identifying and monitoring an individual package without opening up the package. By bringing the handheld RFID reader 50B close to the individual package, the user can retrieve the unique ID number of the electronic device 200 and the temperature and humidity detection history of the package during the whole transportation period. This is advantageous in that temperature and humidity can be monitored even in a dark confined area, especially in the setting of transporting food which must be kept at a certain temperature for health concern, or transporting a large amount of individual packages where user can easily identify the packages.

These embodiments of the present invention may be advantageous in that the electronic device comprises an energy harvesting module for energising the electronic device, which requires low maintenance and investment cost since battery replacement is not necessary. In addition, the electronic device does not require a continuous supply of wired electrical energy source, therefore the simplifying the installation process of the electronic devices for use in a monitoring system.

It is further advantageous in that the detected signals detected by the electronic device can be sent wirelessly through Bluetooth and RFID communication link which allows easy monitoring of one or more attributes of the environment or the object. This enables a smart system for applying in many different areas such as centralised air-conditioning system for enhancing passengers and customers' experience by providing a pleasant environment, as well as cold-chain logistic for easy tracking and monitoring individual packages.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A monitoring system for monitoring one or more attributes of an environment or an object comprising:
    an electronic device;
    an external communicating device arranged to communicate with the electronic device;
    wherein the electronic device comprises
        a functional module arranged to provide an active function;
        a communication module arranged to communicate with the external communication device; and
        an energy harvesting module arranged to transform a source energy from an external source or from ambient environment to electrical energy for energising both the communication module and the functional module, wherein the energy harvesting module comprises an energy harvester which is arranged to harvest the source energy from the external source,
    wherein the source energy includes radio-frequency waves,
    wherein the energy harvester includes radio-frequency energy harvesting antenna, and a voltage regulator arranged to stabilise and regulate a voltage output of the electrical energy for energising both the functional module and the communication module,
    wherein the communication module includes a radio-frequency communication module including a radio-frequency identification (RFID) transponder,
    wherein the external communication device includes an RFID reader,
    wherein the RFID reader is arranged to energise both the RFID transponder and the functional module when upon the RFID reader reads the RFID transponder.

2. The monitoring system in accordance with claim 1, wherein the radio-frequency waves are arranged to be radiated from the RFID reader.

3. The monitoring system in accordance with claim 1, wherein the energy harvesting module further comprises an energy storage arranged to store the transformed electrical energy.

4. The monitoring system in accordance with claim 1, wherein the communication module comprises a communication antenna arranged to communicate with the external communication device.

5. The monitoring system in accordance with claim 4, wherein the communication module further comprises a memory chip arranged to store an output from the functional module.

6. The monitoring system in accordance with claim 4, wherein the communication module includes a Bluetooth communication module.

7. The monitoring system in accordance with claim 6, wherein the communication module includes a Bluetooth Low Energy (BLE) communication module.

8. The monitoring system in accordance with claim 1, wherein the functional module includes a sensor.

9. The monitoring system in accordance with claim 1, wherein the functional module includes a clock arranged to determine a time stamp associated with the one of more electronic outputs.

10. The monitoring system in accordance with claim 1, wherein the source energy further includes light energy, and the energy harvester further includes a photovoltaic panel.

11. The monitoring system in accordance with claim 8, wherein the sensor is arranged to detect one or more attributes of an environment or an object by monitoring one or more electronic outputs, and wherein the one or more electronic outputs change in response to the one or more attributes of the environment or the object.

12. The monitoring system in accordance with claim 8, wherein the sensor includes a temperature sensor and/or a humidity sensor.

13. The monitoring system in accordance with claim 11, wherein the external communication device is arranged to repeatedly communicate with the at least one electronic device in a predetermined time interval so as to monitor the one or more attributes of the environment or the object within a predetermined time period.

14. The monitoring system in accordance with claim 11, wherein the external communication device is further arranged to determine a position of each of the electronic device based on a signal received by the communication device.

15. The monitoring system in accordance with claim 11, wherein the one or more attributes include temperature and/or humidity.

* * * * *